United States Patent Office 2,924,631
Patented Feb. 9, 1960

2,924,631

PROCESS FOR THE PREPARATION OF MONO-VINYLACETYLENE

David Apotheker, Anchorage, Ky., assignor to E. I. du Pont de Nemours and Company, Wilmington, Del., a corporation of Delaware No Drawing. Application March 28, 1957
Serial No. 648,998

5 Claims. (Cl. 260—678)

This invention is directed to the reaction of gases in contact with liquid phase catalysts and more particuarly to the polymerization of acetylene to monovinylacetylene in the presence of a liquid cuprous chloride catalyst solution of a new type.

It is known in the prior art to make monovinylacetylene by passing acetylene through a cuprous chloride catalyst solution dissolved in an aqueous solution of a chloride; see for example U.S. Patents 2,048,838 and 2,200,057. The monovinylacetylene formed according to these processes is swept out of the acetylene thus preventing the formation of more than small amounts of higher polymers such as divinyl acetylene which higher polymers would result from the further reaction of the monovinylacetylene. Nevertheless, the yield of monovinylacetylene from acetylene is reduced by the formation of these and other by-products, this reduction increasing as the conversion of acetylene increases.

Some of these objectionable by-products, such as higher polymers of acetylene are non-volatile and insoluble in water and tend to separate from the catalyst solution upon the walls and other parts of the reaction vessel, thus reducing heat interchange, clogging orifices, and interfering with the function of special parts. Even though these non-volatile products are formed slowly, they accumulate in time and ultimately require expensive shutdown for cleaning. This is particularly true in the case of the sieve-plate type of reactor described in U.S. Patent 2,759,985.

It is apparent, accordingly, that there is a need for improvement to be made in the yield of monovinylacetylene based on the total amount of acetylene consumed; it is necessary to reduce the total proportion of by-products formed. It should be appreciated in this case that, even though yields of monovinylacetylene above 80% are obtainable by known methods, an increase as small as 1% will be of significant and of great importance because of the large production involved.

It is an object of the present invention to increase the yield of monovinylacetylene to an important extent. It is a further object of the present invention to eliminate the bad effects resulting from tar formation in the preparation of monovinylacetylene.

These and other objects will become apparent in the following description and claims.

More specifically, the present invention is directed to the improvement of the basic prior art process of making monovinylacetylene by passing acetylene through an agitated aqueous cuprous chloride catalyst solution, said improvement being in incorporating about 5 to 25% by volume, based on the total volume of catalyst, of a liquid, hydrocarbon or halohydrocarbon dispersed with said catalyst solution followed, if desired, by the further step of removing non-volatile by-products by separating the non-aqueous phase formed.

Typical aqueous catalysts which may be utilized in the present process are described for example in U.S. Patents 2,048,838 and 2,200,057. As shown in these patents, the catalyst solutions should be made slightly acidic with hydrochloric acid. The hydrocarbon or halohydrocarbon to be incorporated in said solution according to the present invention should preferably have a boiling point of at least 100° and not be viscous. The hydrocarbon may be aliphatic, cycloaliphatic or aromatic; examples of the hydrocarbon liquids which may be used are kerosene, fuel oils, white oils, solvent naphthas, and chemical individuals such as toluene, xylene, cymene, mesitylene, decahydronaphthalene and cetane. The kerosenes and other distillates may be derived from petroleum bases predominately paraffinic, naphthenic or aromatic. Fluid chlorinated hydrocarbons boiling above 100° C. may also be used. Examples of these chlorinated hydrocarbons are cetyl chloride, tetrachloroethylene, monochlorobenzene, ortho-dichlorobenzene, chlorocyclohexane and chloronaphthalene.

Kerosene, xylene, decahydronaphthalene, orthodichlorobenzene and fuel oils containing about 50% aromatics are the preferred hydrocarbons.

Suitable types of non-ionic dispersing agents are the polyethylene oxides terminated with phenols, alcohols, mercaptans; polyesters of glycols and dibasic acids; esters of polyhydroxy compounds with fatty acids; and, complex compounds combining these features. Specific examples of such dispersing agents, in addition to those used in Examples 1, 2 and 3 below, are polyethylene oxides terminated with phenol, octyl phenol, xylenol, betanaphthol, octyl alcohol, oleyl alcohol, dodecyl mercaptan, and xylyl mercaptan. Representative examples of the other classes listed above are polyesters of ethylene glycol and maleic or succinic acid, polyesters of tetramethylene glycol and phthalic acid, sorbitan monolaurate, monopalmitate, and monooleate, and polyethylene oxides in which one of the above polyesters or sorbitan esters is used as the terminating group. Ionic dispersing agents which are active and stable in acid solution may also be used. Examples are long-chain quaternary ammonium salts and the hydrochlorides of the copolymers containing basic amino nitrogen and long hydrocarbon side chains described in U.S. Patents 2,737,496 and 2,737,452.

The most useful proportions of the hydrocarbon or chloro-hydrocarbons are between about 5 and 25% by volume, and preferably about 8 to 12%. The smaller proportions give somewhat smaller improvement in yield, while further increases beyond the preferred range do not give proportionate improvement and undesirably dilute the catalyst. The proportion of dispersing agent used is ordinarily between 5 and 15% by weight of the hydrocarbon, depending on the agent, the acidity, and the stability desired for the dispersion. The dispersion should be stable while it is being agitated and used as a catalyst but should stratify on standing or centrifuging.

The following representative examples illustrate the present invention and it is understood that the various hydrocarbons and chlorohydrocarbons and dispersing agents may be utilized interchangeably, as long as the basic conditions of the present process are met, to yield substantially the same significant improved results of increased yield and lack of tar formation.

*Example 1*

The conversion of acetylene to vinylacetylene was carried out in a horizontal tubular reactor, agitated by paddles rotating about its axis, and partly filled with a catalyst of the following composition:

| | Parts by wt. |
|---|---|
| Potassium chloride | 1440 |
| Cuprous chloride | 1890 |
| Water | 2223 |
| Kerosene | 293 |
| Hydrogen chloride | 22 |
| Commercial non-ionic polyethylene oxide dispersing agent, terminated with one mol of unsaturated $C_{18}$ alcohol per 10 of ethylene oxide | 30 |

This catalyst contains approximately 10% kerosene by volume and was made by dissolving the cuprous and potassium chlorides and the hydrochloric acid in the water in the absence of oxygen, then adding the kerosene and ethylene oxide dispersing agent and agitating. A fluid oil-in-water dispersion was formed. Acetylene was introduced at one end of the agitated reactor, maintained at 70° by a water jacket and the reaction mass was withdrawn from the other end. For further mechanical details, see U.S. Patent 1,876,857. The feed was at the rate of about 1,100 parts by weight of acetylene per hour and the pressure was atmospheric. Analysis of the exit gas showed 5.66 mol percent of monovinyl acetylene, 0.43 mol percent of divinylacetylene and 0.49 mol percent of acetaldehyde, the remainder being almost entirely acetylene. This corresponds to a yield of 86% of monovinyl acetylene, based on the weight of acetylene consumed, and a conversion of 12.24% of the acetylene.

The surfaces in contact with the catalyst remained free from tar, which gradually accumulated in the kerosene phase of the catalyst. When desired, the tar could easily be removed from the system by withdrawing part or all of the catalyst from the reactor and allowing it to stand without agitation. The kerosene layer which separated could then be readily decanted. The aqueous layer, substantially free from tar could then be returned to the reactor, with fresh quantities of kerosene and dispersing agent to make up for those removed.

When the same catalyst was used except that no kerosene and dispersing agent were present, and the volume of catalyst (6195 parts by weight) was equal to the total volume of catalyst in Example 1, including the kerosene, the yield was only 82% under otherwise similar conditions in this control experiment and the conversion was 14.0%. The somewhat lower conversion in Example 1, 12.24%, is believed to result from the smaller amount of cuprous chloride (1440 instead of 1600 in the control) present in the catalyst rather than to a specific effect of the kerosene.

Example 2

The catalyst was made as in Example 1 except that the dispersing agent was a polyester of ethylene glycol and phthalic acid. In this case the aqueous phase dispersed in the kerosene on agitating. This water-in-oil dispersion, however, behaved much the same as the oil-in-water dispersion in Example 1, giving an 85% yield of monovinylacetylene under the same conditions. The tar collected in the kerosene phase without sticking to the surfaces with which the catalyst came in contact, and could be removed, as in Example 1, by allowing the catalyst to stand without agitation and decanting the kerosene layer which separated.

Example 3

The catalyst was made as in Example 1 except that xylene was substituted for kerosene. This catalyst gave substantially the same results as those obtained in Example 1.

In addition, substantially the same results were achieved in Example 1 when the kerosene was replaced by (1) a fuel oil of 50% aromatic content, (2) decahydronaphthalene, (3) ortho-dichlorobenzene and when the 10 volume percent kerosene was replaced by (1) 5 volume percent and (2) 20 volume percent kerosene respectively.

Either the water-in-oil or oil-in-water type of catalyst, but preferably the latter, because of its lower viscosity, is also suitable for use in any type of reactor in which the acetylene passes upward through the catalyst as bubbles, whose upward motion supplies the necessary agitation. Such a reaction is described in U.S. Patent 2,759,985. It is usually desirable to use somewhat more dispersing agent (say 15% based on the kerosene) in such cases in order to assure good dispersion in parts where the agitation by the bubbles is slight.

When using a contacting device of the above type in which the bubbles pass upward through a column of catalyst solution, the latter is preferably circulated counter-current to the gas, and, before return to the top of the column, part or all of the stream is passed into a vessel in which it is held long enough to allow the separation of the two phases. The non-aqueous phase, containing the tarry by-products, is then continuously withdrawn.

The separation and purification of the monovinylacetylene produced and the recovery of acetylene for re-use are not a part of this invention but may be carried out in any suitable manner, for example as described in U.S. Patent 2,048,838. When the hydrocarbon or chlorohydrocarbon used in the present invention is volatile and is present in the gas stream leaving the reactor, the process used for separating the acetylene and monovinylacetylene may be modified, if necessary, so as to separate the hydrocarbon or chloro-hydrocarbon from the acetylene and monovinylacetylene. In most cases, the hydrocarbon or chloro-hydrocarbon in the gas stream will be separated along with the by-product divinylacetylene and may be kept with it to assure safety of handling or may be separated by distillation and returned to the catalyst solution.

In the invention above-illustrated any conventional cuprous chloride catalyst solution may be employed, the preferred catalyst being the aqueous solution of cuprous chloride and potassium chloride.

I claim:
1. In a process for the preparation of monovinylacetylene wherein acetylene is passed through an agitated aqueous acidic cuprous chloride catalyst solution, the improvement which comprises dispersing with said catalyst solution, under conditions of agitation, about 5 to 25% by volume, based on the total volume of catalyst, of a liquid selected from the group consisting of non-viscous hydrocarbons and non-viscous chlorinated hydrocarbons having a boiling point of at least 100° C., said dispersing being effected by a dispersing agent selected from the group consisting of non-ionic dispersing agents and acid-stable ionic dispersing agents, followed by recovering pure monovinylacetylene from the effluent gases.

2. In a process for the preparation of monovinylacetylene wherein acetylene is passed through an agitated aqueous acidic cuprious chloride catalyst solution, the improvement which comprises dispersing with said catalyst solution, under conditions of agitation, about 5 to 25% by volume, based on the total volume of catalyst, of a liquid selected from the group consisting of non-viscous hydrocarbons and nonviscous chlorinated hydrocarbons having a boiling point of at least 100° C., said dispersing being effected by a dispersing agent selected from the group consisting of non-ionic dispersing agents and acid-stable ionic dispersing agents, followed by withdrawing a portion of the resulting dispersion, allowing it to separate into layers and removing non-volatile by-products by separating the layers, and, returning the catalyst solution to the process, the resulting monovinylacetylene being recovered from the effluent gases.

3. The process according to claim 2 wherein about 8 to about 12% by volume of said hydrocarbon liquid is dispersed in said catalyst solution.

4. The process according to claim 2 wherein said hydrocarbon liquid is kerosene dispersed in said catalyst solution by agitation in the presence of a polyethylene oxide derivative as dispersing agent.

5. The process according to claim 2 wherein said hydrocarbon liquid is kerosene dispersed in said catalyst solution by agitation in the presence of a polyester of ethylene glycol and phthalic acid as dispersing agent.

References Cited in the file of this patent

UNITED STATES PATENTS

| | | |
|---|---|---|
| 2,131,197 | Stadler et al. | Sept. 27, 1938 |
| 2,566,136 | Morrell | Aug. 28, 1951 |